US008014055B2

(12) United States Patent
Mochizuki

(10) Patent No.: US 8,014,055 B2

(45) Date of Patent: Sep. 6, 2011

(54) ELECTRO-OPTIC DEVICE AND ELECTRONIC APPARATUS

(75) Inventor: Hiroaki Mochizuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 12/197,083

(22) Filed: Aug. 22, 2008

(65) Prior Publication Data

US 2009/0052001 A1 Feb. 26, 2009

(30) Foreign Application Priority Data

Aug. 23, 2007 (JP) ................................ 2007-216790

(51) Int. Cl.
*G02F 1/03* (2006.01)
*G02B 26/00* (2006.01)

(52) U.S. Cl. ......................... 359/259; 359/245; 359/237

(58) Field of Classification Search .................. 359/259, 359/245, 315, 316, 237, 248–250, 263, 252–254, 359/318; 249/24, 113
See application file for complete search history.

(56) References Cited

U.S. PATENT DOCUMENTS 6,670,944 B1 * 12/2003 Ishii .............................. 345/100
2001/0033264 A1 * 10/2001 Ishii ................................ 345/92
2004/0239610 A1 * 12/2004 Ishii .............................. 345/100
2006/0267913 A1 * 11/2006 Mochizuki et al. ........... 345/100

FOREIGN PATENT DOCUMENTS

JP 06-102531 4/1994

* cited by examiner

*Primary Examiner* — Dawayne A Pinkney
(74) *Attorney, Agent, or Firm* — Workman Nydegger

(57) ABSTRACT

An electro-optic device includes a shift register and another circuit. Source and drain regions of transistors in the shift register contain the same kind of impurity as that contained in the source and drain regions of transistors in the other circuit and contain a higher concentration of the impurity than a concentration of the impurity in the source and drain regions of transistors in the other circuit.

3 Claims, 7 Drawing Sheets

ELECTRO-OPTIC DEVICE AND ELECTRONIC APPARATUS

BACKGROUND

1. Technical Field

The present invention relates to a technical field of an electro-optic device, such as a liquid crystal display device, and an electronic apparatus, such as a liquid crystal projector, including the electro-optic device.

2. Related Art

An electro-optic device of this kind includes a substrate having thereon a pixel area and a peripheral area surrounding the pixel area such that a plurality of pixel units connected to scanning lines and data lines are arranged in the pixel area and peripheral circuits, such as a data line driving circuit for driving the data lines, a scanning line driving circuit for driving the scanning lines, and a sampling circuit for sampling image signals, are arranged in the peripheral area.

The data line driving circuit includes a shift register for sequentially outputting transferred signals and generates sampling-circuit driving signals on the basis of the transferred signals. The sampling circuit samples image signals supplied to image signal lines synchronously with the sampling-circuit driving signals supplied from the data line driving circuit, and supplies the sampled signals to the data lines.

For example, JP-A-6-102531 discloses a technique of forming transistors constituting a peripheral circuit such that each transistor has a lightly doped drain (LDD) structure in order to increase the source-drain withstand voltage of the transistor.

However, there is the following technical problem: The higher the operating frequency, the shorter the life of the shift register. Unfortunately, the life of the electro-optic device is reduced. On the other hand, this kind of electro-optic device is generally required to increase the on-state current of each of the transistors constituting the data line driving circuit and the sampling circuit in order to improve the driving capabilities of those circuits.

SUMMARY

An advantage of some aspects of the invention is to provide an electro-optic device capable of displaying high-quality images while extending the life of the device and an electronic apparatus including the electro-optic device.

According to a first aspect of the invention, an electro-optic device includes a substrate, a plurality of data lines and a plurality of scanning lines arranged on the substrate such that the data lines intersect the scanning lines, a plurality of pixel units arranged for pixels corresponding to the respective intersections, and an image signal supply circuit including a shift register that sequentially outputs transferred signals and another circuit that supplies image signals to the pixel units via the data lines in response to the sequentially output transferred signals. The shift register includes a plurality of first transistors each including a first semiconductor layer having a first source region and a first drain region. The other circuit includes a plurality of second transistors each including a second semiconductor layer having a second source region and a second drain region. The second source and drain regions contain the same kind of impurity as that contained at a predetermined concentration in the first source and drain regions such that the concentration of the impurity in the second source and drain regions is higher than the predetermined concentration.

In the electro-optic device according to this aspect of the invention, the transferred signals are sequentially output from respective stages of the shift register in response to a clock signal having a predetermined period during operation of the device. Subsequently, for example, an enable circuit, which constitutes part of the other circuit, ANDs an enable signal and the transferred signal from each stage of the shift register and supplies the AND of the signals as a sampling-circuit driving signal to a sampling circuit, which constitutes another part of the other circuit. In this instance, the pulse width of the enable signal is set to be shorter than that of the clock signal, so that the successively supplied sampling-circuit driving signals are not overlapped. The sampling circuit samples the image signals supplied externally in accordance with the sampling-circuit driving signals and supplies the sampled image signals to the data lines. Each pixel unit modulates light in accordance with the image signal supplied from the corresponding data line, so that an image is displayed in a display area where the pixel units are arranged.

According to this aspect of the invention, the shift register, constituting part of the image signal supply circuit, includes the first transistors each including the first semiconductor layer having the first source and drain regions. The other circuit, constituting another part of the image signal supply circuit, includes the second transistors each including the second semiconductor layer having the second source and drain regions. The first and second transistors may be constructed as a self-aligned transistor or a transistor having the LDD structure.

According to this aspect of the invention, particularly, the second source and drain regions in each second transistor contain the same kind of impurity as that contained at the predetermined concentration in the first source and drain regions in each first transistor such that the concentration of the impurity in the second source and drain regions is higher than the predetermined concentration. More specifically, the concentration of the impurity in the second source and drain regions of the second transistor included in the other circuit is higher than that in the first source and drain regions of the first transistor included in the shift register. In other words, the impurity concentration in the first source and drain regions of the first transistor included in the shift register is lower than that in the second source and drain regions of the second transistor included in the other circuit.

Accordingly, the on-state current of the first transistor included in the shift register can be lowered and the on-state current of the second transistor included in the other circuit can be increased. Therefore, the current consumption in the first transistor included in the shift register can be reduced and the capability of the second transistor included in the other circuit can be increased. Advantageously, the life of the shift register can be extended and the driving capability of the other circuit can be increased.

Consequently, the electro-optic device according to the first aspect of the invention can display high-quality images while extending the life of the device.

In the electro-optic device according to the first aspect of the invention, the other circuit may include the following elements. An enable circuit shapes the waveforms of the sequentially output transferred signals using a plurality of enable signals to output the resultant signals as shaped signals. A sampling circuit samples the image signals in response to the shaped signals or signals based on the shaped signals to supply the sampled signals to the data lines.

In this case, the enable circuit and the sampling circuit each include the second transistors. Accordingly, the driving capabilities of the enable circuit and the sampling circuit can be increased.

According to a second aspect of the invention, an electro-optic device includes a substrate, a plurality of data lines and a plurality of scanning lines arranged on the substrate such that the data lines intersect the scanning lines, a plurality of pixel units arranged for pixels corresponding to the respective intersections, and an image signal supply circuit including a shift register that sequentially outputs transferred signals and another circuit that supplies image signals to the pixel units via the data lines in response to the sequentially output transferred signals. The shift register includes a plurality of first transistors each including a first semiconductor layer having a first channel region, a first source region, a first drain region, and first LDD regions formed such that one of the first LDD regions is disposed between the first channel region and the first source region and the other is disposed between the first channel region and the first drain region. The other circuit includes a plurality of second transistors each including a second semiconductor layer having a second channel region, a second source region, a second drain region, and second LDD regions formed such that one of the second LDD regions is disposed between the second channel region and the second source region and the other is disposed between the second channel region and the second drain region. The second LDD regions contain the same kind of impurity as that contained at a predetermined concentration in the first LDD regions such that the concentration of the impurity in the second LDD regions is higher than the predetermined concentration.

The electro-optic device according to the second aspect of the invention displays an image in a display area, where the pixel units are arranged, in a manner substantially similar to the above-described electro-optic device according to the first aspect of the invention.

According to the second aspect, the shift register, constituting part of the image signal supply circuit, includes the first transistors each including the first semiconductor layer having the first LDD regions. The other circuit, constituting another part of the image signal supply circuit, includes the second transistors each including the second semiconductor layer having the second LDD regions. In other words, the first and second transistors are constructed as transistors having the LDD structure. The term "LDD region" means a region formed by, for example, ion implantation, i.e., implanting (or doping) impurity ions into a semiconductor layer such that the amount of impurity ions is less than that in the source and drain regions.

According to this aspect of the invention, particularly, the second LDD regions in each second transistor contain the same kind of impurity as that contained at the predetermined concentration in the first LDD regions in each first transistor such that the concentration of the impurity in the second LDD regions is higher than the predetermined concentration. More specifically, the concentration of the impurity in the second LDD regions in the second transistor included in the other circuit is higher than that in the first LDD regions in the first transistor included in the shift register. In other words, the impurity concentration in the first LDD regions of the first transistor included in the shift register is lower than that in the second LDD regions of the second transistor included in the other circuit.

Accordingly, the on-state current of the first transistor included in the shift register can be lowered and the on-state current of the second transistor included in the other circuit can be increased. Therefore, the current consumption in the first transistor included in the shift register can be reduced and the capability of the second transistor included in the other circuit can be increased. Advantageously, the life of the shift register can be extended and the driving capability of the other circuit can be increased. Consequently, the electro-optic device according to the second aspect of the invention can display high-quality images while extending the life of the device.

According to a third aspect of the invention, an electronic apparatus includes the above-described electro-optic device according to the first or second aspect of the invention.

Since the electronic apparatus according to this aspect of the invention includes the electro-optic device according to the first or second aspect of the invention, various electronic apparatuses, such as a projection display, a television, a mobile phone, an electronic organizers a word processor, a view-finder type or monitor-direct-view type video tape recorder, a workstation, a video phone, a POS terminal, and a touch panel, capable of displaying high-quality images can be realized. In addition, an electrophoretic device, such as an electronic paper, electron emission devices, such as a field emission display and a conduction electron-emitter display, and displays using the electrophoretic device or the electron emission device can be realized as electronic apparatuses according to this aspect of the invention.

Other features and advantages of the invention will become more apparent from the following description.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings. In the following embodiments, a driving circuit built-in TFT active matrix driving liquid crystal display device will be described as an example of an electro-optic device according to the invention.

First Embodiment

A liquid crystal display device according to a first embodiment will now be described with reference to FIGS. 1 to 7.

Figure 1:
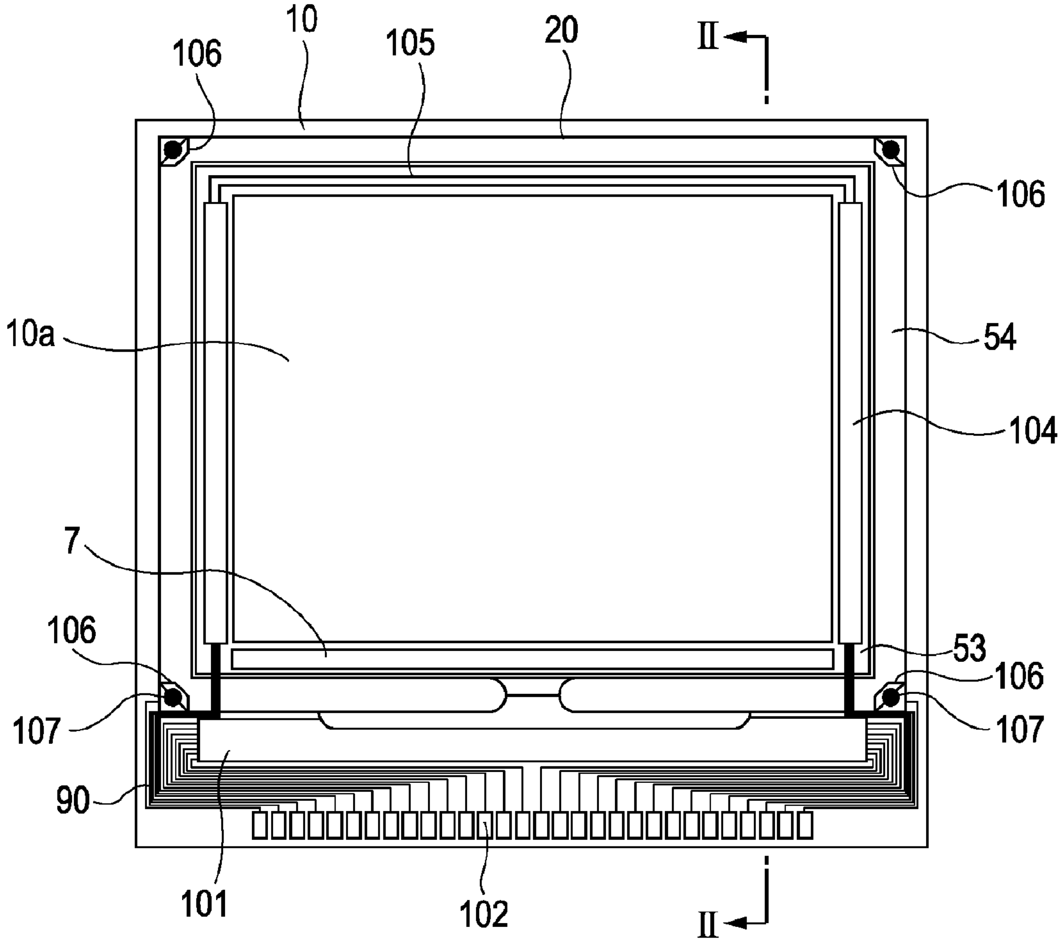
FIG. 1 is a plan view of the entire structure of a liquid crystal display device, serving as an electro-optic device, according to a first embodiment of the invention.
Figure 2:
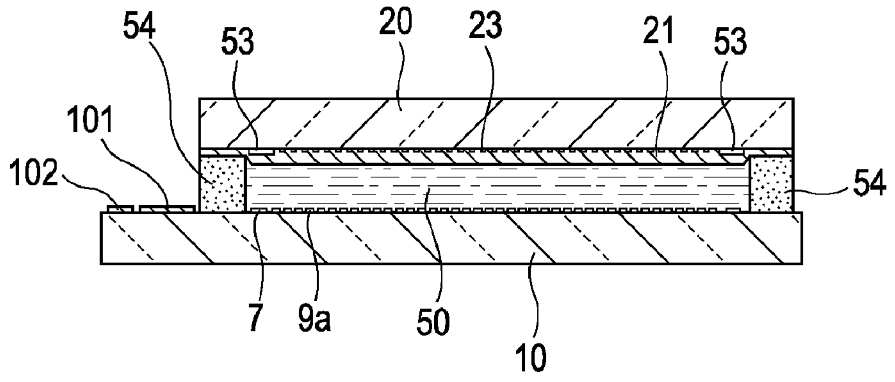
FIG. 2 is a cross-sectional view taken along the line II-II in FIG. 1.

First, the entire structure of the liquid crystal display device according to this embodiment will be described with reference to FIGS. 1 and 2. FIG. 1 is a plan view of the entire structure of the liquid crystal display device according to the embodiment. FIG. 2 is a cross-sectional view taken along the line II-II in FIG. 1.

Referring to FIGS. 1 and 2, the liquid crystal display device according to this embodiment includes a TFT array substrate 10 and an opposite substrate 20 which face each other. A liquid crystal layer 50 is sandwiched between the TFT array substrate 10 and the opposite substrate 20. The TFT array substrate 10 and the opposite substrate 20 are attached to each other with a seal 54 arranged in a seal area surrounding an image display area 10*a*.

In FIG. 1, the opposite substrate 20 has thereon a frame-shaped light-shielding layer 53 defining a frame portion of the image display area 10*a* such that the frame-shaped light-shielding layer 53 is arranged in parallel to the inner periphery of the seal area where the seal 54 is arranged. In an area located outside the seal area in which the seal 54 is arranged, a data line driving circuit 101 and external-circuit connection terminals 102 are arranged along a first side of the TFT array substrate 10. The data line driving circuit 101 and a sampling circuit 7, which will be described later, constitute a circuit block corresponding to an image signal supply section. In an area located inside the seal area along this first side, the sampling circuit 7 is disposed such that the circuit is covered with the frame-shaped light-shielding layer 53. In an area inside the seal area along each of two sides next to the first side, a scanning line driving circuit 104 is arranged such that the circuit is covered with the frame-shaped light-shielding layer 53. To connect the two scanning line driving circuits 104 disposed on opposite sides of the image display area 10*a*, a plurality of lines 105 are arranged along the remaining side of the TFT array substrate 10 such that the lines are covered with the frame-shaped light-shielding layer 53. In addition, four vertical conduction terminals 106 for connecting the two substrates with a vertical conduction material 107 are arranged on the TFT array substrate 10 such that the terminals are opposed to the four corners of the opposite substrate 20, respectively. Those components enable electrical connection between the TFT array substrate 10 and the opposite substrate 20.

The TFT array substrate 10 further has thereon wiring lines 90 for electrically connecting the external-circuit connection terminals 102, the data line driving circuit 101, the scanning line driving circuits 104, and the vertical conduction terminals 106.

Referring to FIG. 2, the TFT array substrate 10 has thereon a laminate including pixel switching thin film transistors (TFTs) and lines, such as scanning lines and data lines. In the image display area 10*a*, the pixel switching TFTs, the scanning lines, and the data lines are overlaid with a matrix of pixel electrodes 9*a* composed of a transparent material, e.g., indium tin oxide (ITO). The pixel electrodes 9*a* are overlaid with an alignment layer. On the other hand, the opposite substrate 20 has a light-shielding layer 23 on one surface opposed to the TFT array substrate 10. The light-shielding layer 23 is made of, for example, a light-shielding metal film. The light-shielding layer 23 is arranged in, for example, a lattice pattern within the image display area 10*a* on the opposite substrate 20. The light-shielding layer 23 is overlaid with a counter electrode 21, made of a transparent material, e.g., ITO such that the single counter electrode 21 is opposed to all of the pixel electrodes 9*a*. The counter electrode 21 is overlaid with an alignment layer. The liquid crystal layer 50 comprises a single type or a mixture of several types of nematic liquid crystal. The liquid crystal has a predetermined alignment state between the pair of alignment layers.

Although being not shown in the diagram, a test circuit or a test pattern for testing the quality of the liquid crystal display device or finding a defect in the device during manufacture or before shipment may be arranged on the TFT array substrate 10 in addition to the data line driving circuit 101 and the scanning line driving circuits 104.

Figure 3:
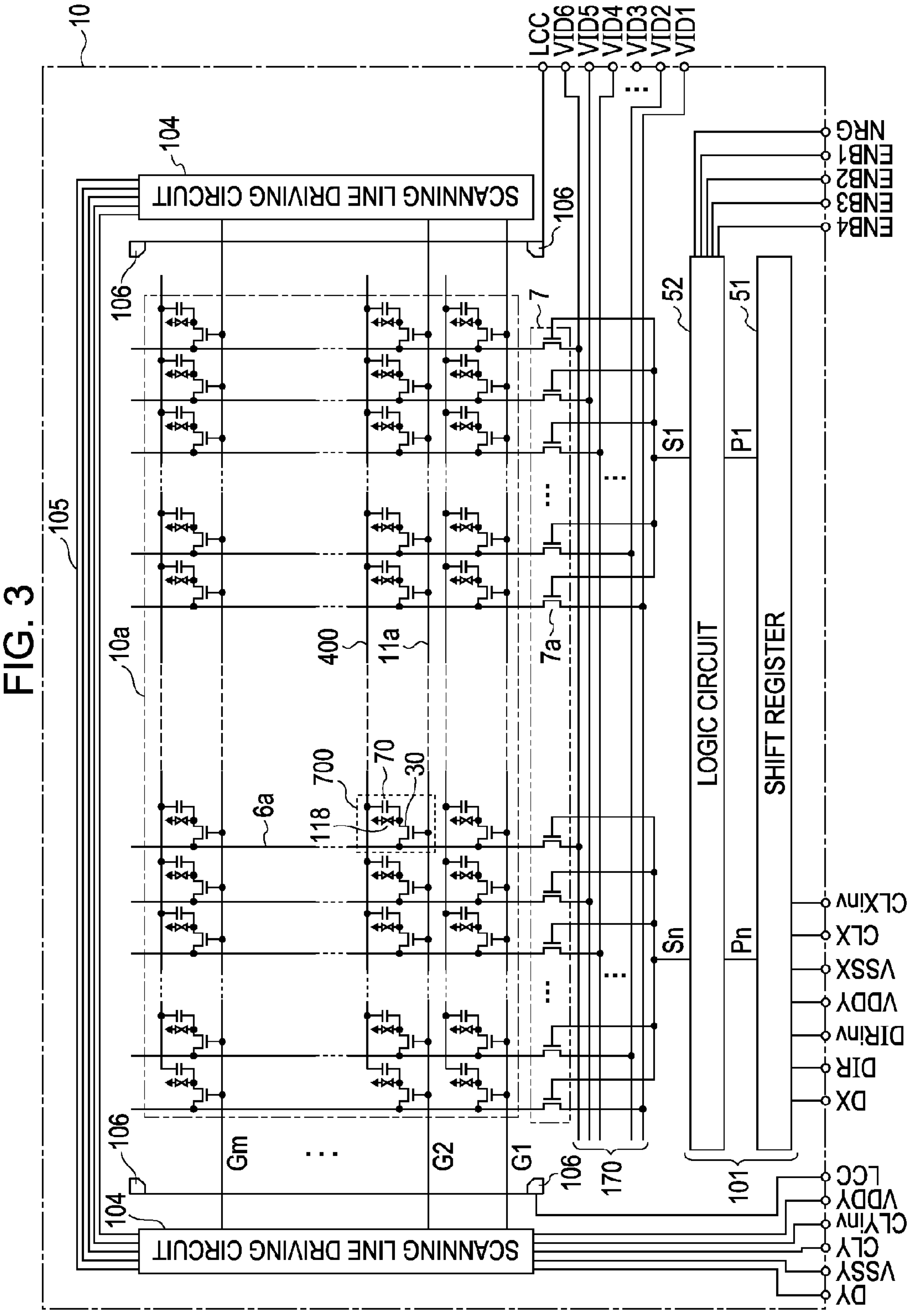
FIG. 3 is a block diagram of the electrical structure of the liquid crystal display device according to the first embodiment.
Figure 4:
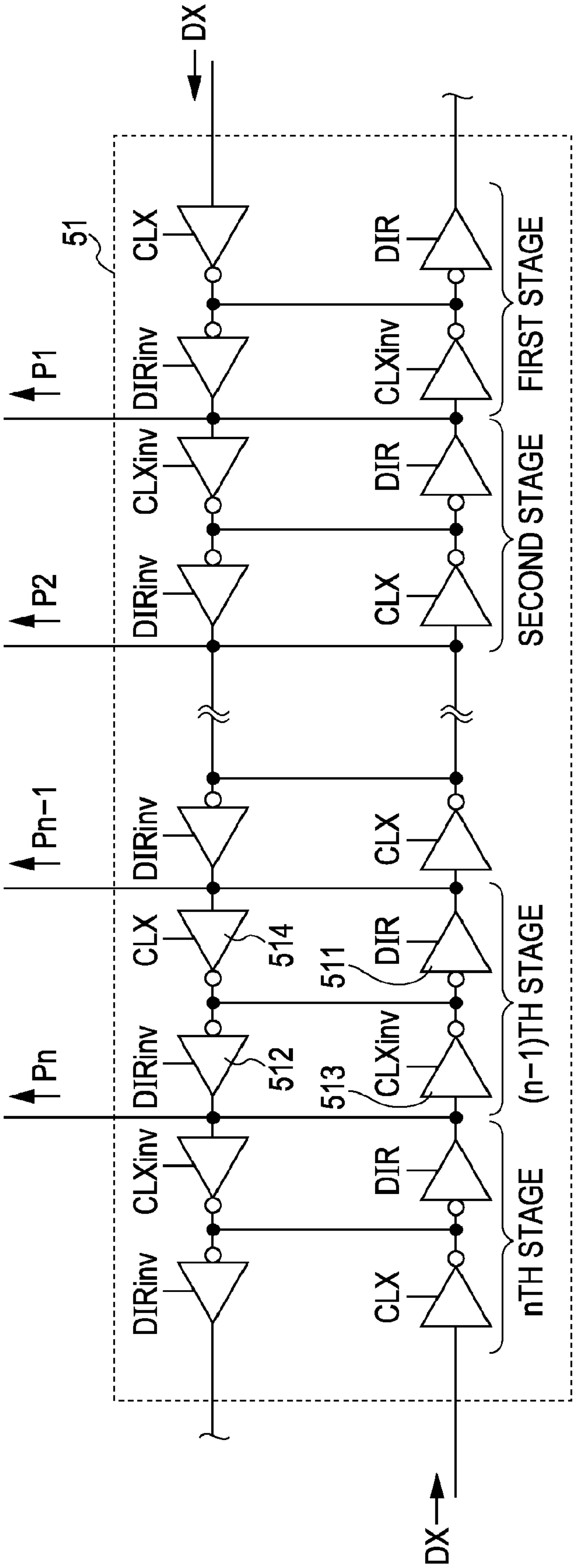
FIG. 4 is a circuit diagram illustrating the structure of a shift register.
Figure 5A:
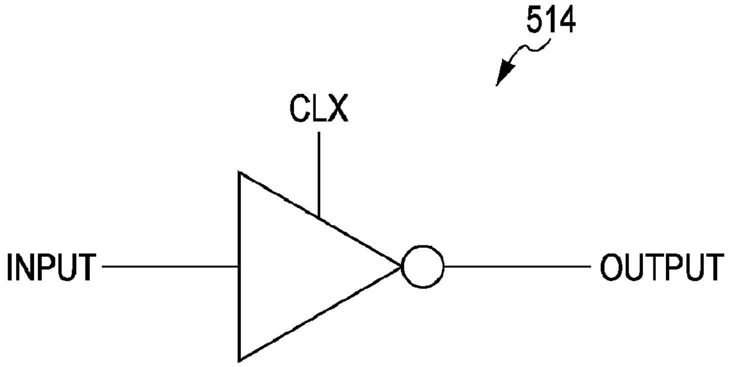
FIGS. 5A and 5B are circuit diagrams each showing the structure of a clocked inverter included in the shift register.
Figure 5B:
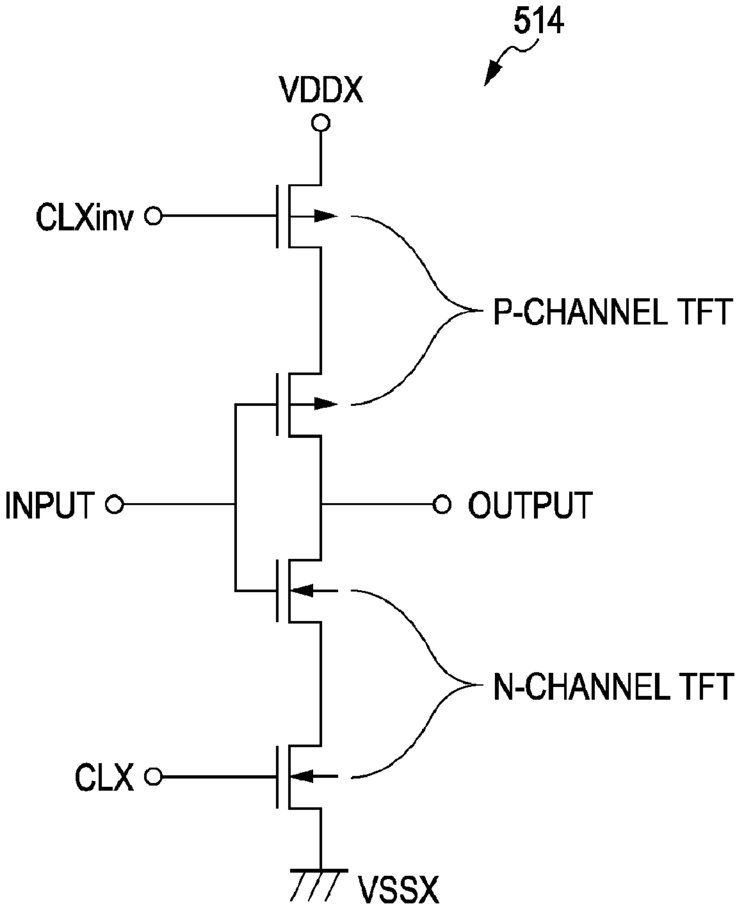
Figure 6:
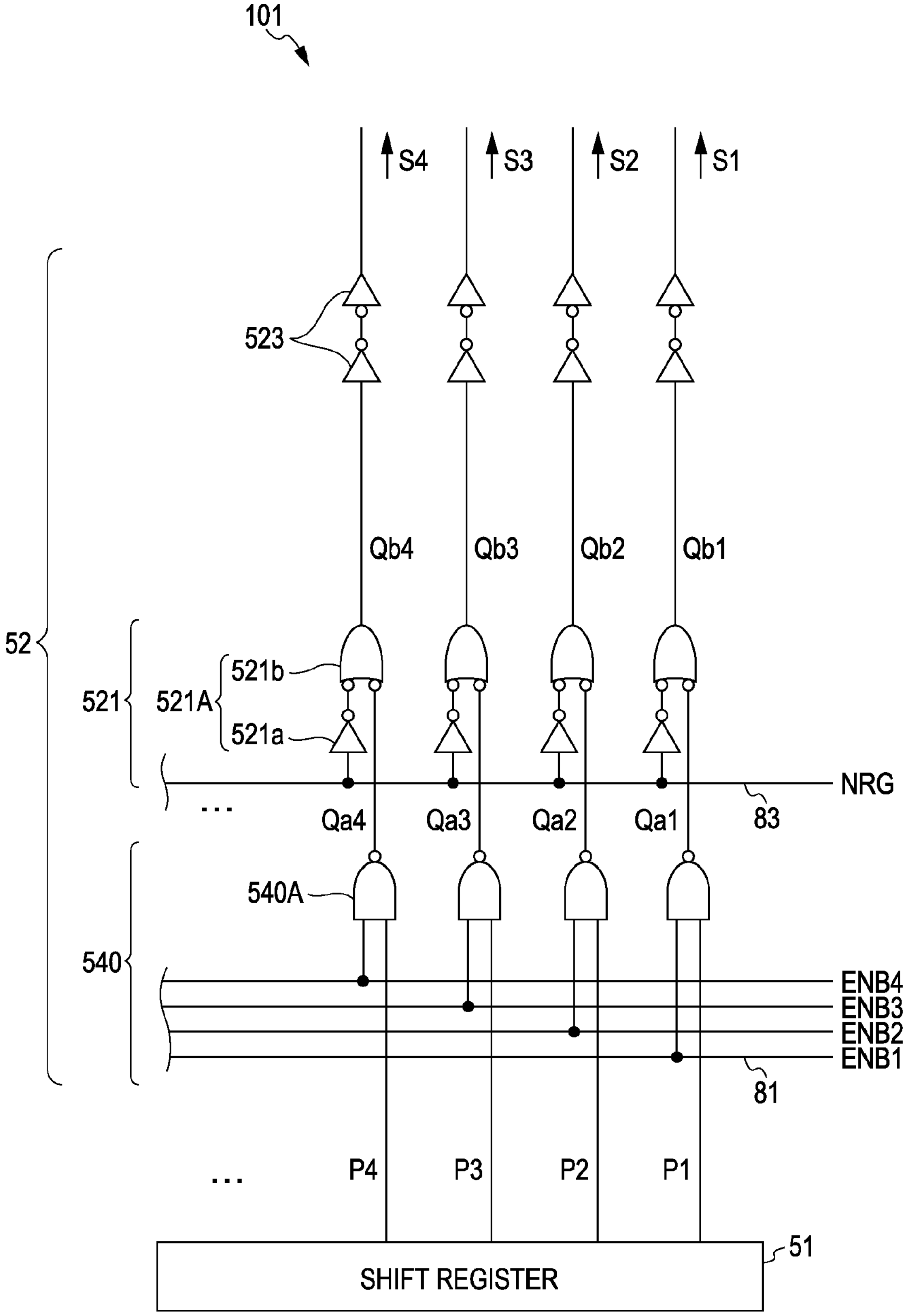
FIG. 6 is a circuit diagram illustrating the structure of a logic circuit included in a data line driving circuit.

The electrical structure of the liquid crystal display device according to this embodiment will now be described with reference to FIGS. 3 to 6. FIG. 3 is a block diagram illustrating the electrical structure of the liquid crystal display device according to the embodiment. FIG. 4 is a circuit diagram showing the structure of a shift register. FIGS. 5A and 5B are circuit diagrams each showing the structure of a clocked inverter included in the shift register. FIG. 6 is a circuit diagram showing the structure of a logic circuit included in the data line driving circuit.

Referring to FIG. 3, the liquid crystal display device according to the embodiment includes the scanning line driving circuits 104, the data line driving circuit 101, and the sampling circuit 7 arranged on the TFT array substrate 10.

The scanning line driving circuits 104 receive a Y clock signal CLY, an inverted Y clock signal CLYinv, a Y start pulse DY, a power supply voltage from a power supply VDDY, and a power supply voltage from a power supply VSSY through the external-circuit connection terminals 102 (refer to FIG. 1). When receiving the Y start pulse DY, the scanning line driving circuits 104 sequentially generate scanning signals G1 to Gm synchronously with the Y clock signal CLY and the inverted Y clock signal CLYinv and outputs the generated signals. The potential of the power supply VSSY is lower than that of the power supply VDDY.

The data line driving circuit 101 includes the shift register, indicated at 51, and the logic circuit, indicated at 52. The logic circuit 52 corresponds to another section.

The shift register 51 receives an X clock signal CLX, an inverted X clock signal CLXinv, an X start pulse DX, a transfer-direction control signal DIR, an inverted transfer-direction control signal DIRinv, a power supply voltage from a power supply VDDX, and a power supply voltage from a power supply VSSX through the external-circuit connection terminals 102 (refer to FIG. 1). The inverted X clock signal CLXinv is obtained by inverting the X clock signal CLX and the inverted transfer-direction control signal DIRinv is obtained by inverting the transfer-direction control signal DIR. The potential of the power supply VSSX is lower than that of the power supply VDDX.

The shift register 51, which is of a bidirectional type, sequentially transfers the start pulse DX in the direction from right to left or from left to right on the basis of the X clock signal CLX, the inverted X clock signal CLXinv, the transfer-direction control signal DIR, and the inverted transfer-direction control signal DIRinv to sequentially output transferred signals Pi (i=1, . . . , n) from respective stages (i.e., first to nth stages in FIG. 4 which will be described later).

Specifically, each stage of the shift register 51 includes four clocked inverters 511, 512, 513, and 514, as shown in FIG. 4.

The clocked inverter 511 is constructed and connected so that when the transfer-direction control signal DIR goes to a high level, the clocked inverter 511 can transfer a signal and fixes the transfer direction to the direction from left to right.

The clocked inverter 512 is constructed and connected so that when the inverted transfer-direction control signal DIRinv becomes the high level, the clocked inverter 512 can transfer a signal and fixes the transfer direction to the direction from right to left.

The transfer-direction control signal DIR is always opposite in level to the inverted transfer-direction control signal DIRinv.

The clocked inverter 513 is constructed and connected so that while the transfer direction is fixed to the direction from left to right, the clocked inverter 513 transfers a signal transferred through the clocked inverter 511 when the inverted X clock signal CLXinv becomes the high level, and while the transfer direction is fixed to the direction from right to left, the clocked inverter 513 feeds back a signal transferred through the clocked inverter 512 when the inverted X clock signal CLXinv becomes the high level.

The clocked inverter 514 is constructed and connected so that while the transfer direction is fixed to the direction from right to left, the clocked inverter 514 transfers a signal transferred through the clocked inverter 512 when the X clock signal CLX becomes the high level, and while the transfer direction is fixed to the direction from left to right, the clocked inverter 514 feeds back a signal transferred through the clocked inverter 511 when the X clock signal CLX becomes the high level.

The X clock signal CLX is always opposite in level to the inverted X clock signal CLXinv.

In this instance, the concrete circuit structure of the clocked inverter 514 selectively shown in FIG. 5A will be described with reference to FIG. 5B. The other clocked inverters 511, 512, and 513 have the same circuit structure, except for the signals to be supplied to clock input terminals. Instead of the X clock signal CLX and the inverted X clock signal CLXinv, the transfer-direction control signal DIR and the inverted transfer-direction control signal DIRinv are supplied to the clock input terminals of the clocked inverter 511. Instead of the X clock signal CLX and the inverted X clock signal CLXinv, the inverted transfer-direction control signal DIRinv and the transfer-direction control signal DIR are supplied to the clock input terminals of the clocked inverter 512. Instead of the X clock signal CLX and the inverted X clock signal CLXinv, the inverted X clock signal CLXinv and the X clock signal CLX are supplied to the clock input terminals of the clocked inverter 513.

Referring to FIG. 5B, the clocked inverter 514 includes an n-channel TFT of which the gate is supplied with the X clock signal CLX, a p-channel TFT and an n-channel TFT connected in parallel to each other so that the gate of each TFT is supplied with a transferred signal, and a p-channel TFT of which the gate is supplied with the inverted X clock signal CLXinv, those TFTs being arranged between the power supply VSSX and the power supply VDDX. More specifically, the power supply VSSX is electrically connected to the source of the n-channel TFT of which the gate is supplied with the X clock signal CLX, and the drain of this n-channel TFT is electrically connected to the source of the other n-channel TFT of which the gate is supplied with the transferred signal. Furthermore, the power supply VDDX is electrically connected to the source of the p-channel TFT of which the gate is supplied with the inverted X clock signal CLXinv, and the drain of this p-channel TFT is electrically connected to the source of the other p-channel TFT of which the gate is supplied with the transferred signal. In addition, the drain of the p-channel TFT of which the gate is supplied with the transferred signal is electrically connected to that of the n-channel TFT of which the gate is supplied with the transferred signal so that those p-channel and n-channel TFTs share the common drain.

Again referring to FIG. 3, the logic circuit 52 is supplied with, for example, enable signals ENB1 to ENB4 supplied through four lines and a precharge selection signal NRG through the external-circuit connection terminals 102 (see FIG. 1).

The logic circuit 52 has a function of shaping the waveforms of the transferred signals Pi (i=1, . . . , n) output from the shift register 51 on the basis of the enable signals ENB1 to ENB4 and outputting the resultant signals as sampling-circuit driving signals Si (i=1, . . . , n).

More specifically, the logic circuit 52 includes an enable circuit 540, a precharge circuit 521, and inversion circuits 523, as shown in FIG. 6.

Referring to FIG. 6, the enable circuit 540 includes logic circuits each shaping the waveform of the transferred signal Pi output from the shift register 51. More specifically, the enable circuit 540 is composed of NAND circuits 540A, serving as unit circuits corresponding to the respective stages of the shift register 51.

The gate of each NAND circuit 540A is supplied with the transferred signal Pi output from the corresponding stage of the shift register 51 and any one of the enable signals ENB1 to ENB4 supplied via four enable signal supply lines 81 through the external-circuit connection terminals 102.

The NAND circuit 540A ANDs the supplied transferred signal Pi and any of the enable signals ENB1 to ENB4 to shape the waveform of the transferred signal Pi. Thus, the NAND circuit 540A generates the resultant signal, obtained by shaping the waveform of the transferred signal Pi, as a shaped signal Qai and outputs the generated signal. Each unit circuit may include an inversion circuit for inverting the logic level of the transferred signal Pi supplied to the NAND circuit 540A or any of the enable signals ENB1 to ENB4 and that of the shaped signal Qai output from the NAND circuit 540A in addition to the NAND circuit 540A.

The enable circuit 540 trims the waveform of the transferred signal Pi on the basis of the waveform of any of the enable signals ENB1 to ENB4 having a narrower pulse width. Finally, the pulse shape of the transferred signal Pi, more specifically, the pulse width and pulse period thereof are limited.

As described above, the enable circuit 540 is integrated with the logic circuits and is composed of the NAND circuits 540A. Advantageously, the enable circuit 540 can be simply constructed without substantially increasing the number of circuit elements and that of wiring lines.

Referring to FIG. 6, the precharge circuit 521 includes unit circuits 521A corresponding to the respective stages of the shift register 51. Each unit circuit 521A includes an inversion circuit 521*a* and a NAND circuit 521*b*. The inversion circuit 521*a* inverts the logic level of the precharge selection signal NRG supplied via a precharge signal supply line 83. The gate of the NAND circuit 521*b* is supplied with the precharge selection signal NRG, of which the logic level is inverted by the inversion circuit 521*a*, and the shaped signal Qai. Each unit circuit 521A substantially functions as a NOR circuit. Each unit circuit 521A ORs the shaped signal Qai and the precharge selection signal NRG and outputs either the shaped signal Qai or the precharge selection signal NRG as an output signal Qbi. The output signal Qbi is output as a sampling-circuit driving signal Si (i=1, . . . , or n) through two inversion circuits 523.

The above-described circuit structure of the logic circuit 52 allows the precharge circuit 521 to have a simple structure. Advantageously, the precharge circuit 521 can be constructed without increasing the number of circuit elements or wiring lines.

Again referring to FIG. 3, the sampling circuit 7 corresponds to the other section and includes a plurality of sampling switches 7*a* each comprising an n-channel TFT. The sampling switches 7*a* may each comprise a p-channel TFT or a complementary TFT.

The sampling circuit 7 receives image signals VID1 to VID6, serial-parallel expanded (phase-expanded) into six phases (or six pieces), through the external-circuit connection terminals 102 and six (N=6) image signal lines 170. The sampling circuit 7 is constructed such that the sampling switches 7*a* supply the image signals VID1 to VID6 to each data line group including six data lines 6*a* in response to the sampling-circuit driving signals Si to Sn output from the data line driving circuit 101. According to this embodiment, since a plurality of data lines 6*a* are driven every data line group, the driving frequency can be lowered.

The number of expanded phases of image signals (i.e., the number of serial-parallel expanded image signals) is not limited to six phases. In other words, serial-parallel expanded image signals with, for example, nine phases, 12 phases, 24 phases, 48 phases, or 96 phases may be supplied to the sampling circuit 7 through nine, 12, 24, 48, or 96 image signal lines.

Referring to FIG. 3, the liquid crystal display device according to this embodiment includes the data lines 6*a* and scanning lines 11*a* arranged vertically and horizontally in the image display area 10*a* (see FIG. 1) located in a central portion of the TFT array substrate 10. The liquid crystal display device further includes pixel units 700 corresponding to the respective intersections of the data lines and the scanning lines. Each pixel unit 700 includes the pixel electrode 9*a* of a liquid crystal element 118 and a TFT 30 for pixel switching, i.e., switching control of the pixel electrode 9*a*. The TFT 30 will be referred to as "pixel switching TFT". The pixel electrodes 9*a* and the TFTs 30 are arranged in a matrix. In this embodiment, it is assumed that the total number of scanning lines 11*a* is m (m is a natural number of 2 or more) and that of data lines 6*a* is n×6 (n is a natural number of 2 or more).

Regarding the structure of each pixel unit 700 in FIG. 3, the source electrode of the pixel switching TFT 30 is electrically connected to the data line 6*a* to which the image signal VIDk (k=1, 2, 3, . . . , or 6) is supplied, the gate electrode thereof is electrically connected to the scanning line 11*a* to which the scanning signal Gj (j=1, 2, 3, . . . , or m) is supplied, and the drain electrode thereof is connected to the pixel electrode 9*a* of the liquid crystal element 118. In each pixel unit 700, the liquid crystal element 118 includes the pixel electrode 9*a*, the counter electrode 21, and the liquid crystal sandwiched therebetween. Accordingly, the pixel units 700 are arranged in a matrix so as to correspond to the respective intersections of the scanning lines 11*a* and the data lines 6*a*.

During operation of the liquid crystal display device according to the embodiment, the scanning lines 11*a* are sequentially selected in accordance with the scanning signals Gj (j=1, 2, 3, . . . , m) output from the scanning line driving circuits 104. In each pixel unit 700 associated with the selected scanning line 11*a*, when the scanning signal Gj is supplied to the pixel switching TFT 30, the pixel switching TFT 30 is turned on, so that the pixel unit 700 enters a selected state. The pixel electrode 9*a* of the liquid crystal element 118 is supplied with the image signal VIDk from the corresponding data line 6*a* at predetermined timing while the pixel switching TFT 30 is closed for a predetermined period. Thus, a voltage determined by the potential of the pixel electrode 9*a* and that of the counter electrode 21 is applied to the liquid crystal element 118. The alignment or order of liquid crystal molecular assembly varies depending on the level of voltage applied, so that the liquid crystal modulates light to achieve gray-scale display. In the normally white mode, the transmittance ratio of the outgoing light quantity to the incident light quantity is reduced in accordance with a voltage applied to each pixel unit. In the normally black mode, the transmittance ratio is increased in accordance with a voltage applied to each pixel unit. Consequently, light with contrast according to the image signals VID1 to VID6 emerges from the liquid crystal display device according to the embodiment.

In order to prevent leakage of the held image signal, a storage capacitor 70 is additionally arranged in parallel to each liquid crystal element 118. One electrode of the storage capacitor 70 is connected to the drain of the TFT 30 in parallel to the pixel electrode 9*a*. The other electrode of the storage capacitor 70 is connected to a capacitance line 400 with a fixed potential so as to have a constant potential.

The vertical conduction terminals 106 are supplied with a common power supply voltage LCC, serving as a common potential. A reference potential of the above-described counter electrode 21 is determined on the basis of the common power supply voltage.

Figure 7:
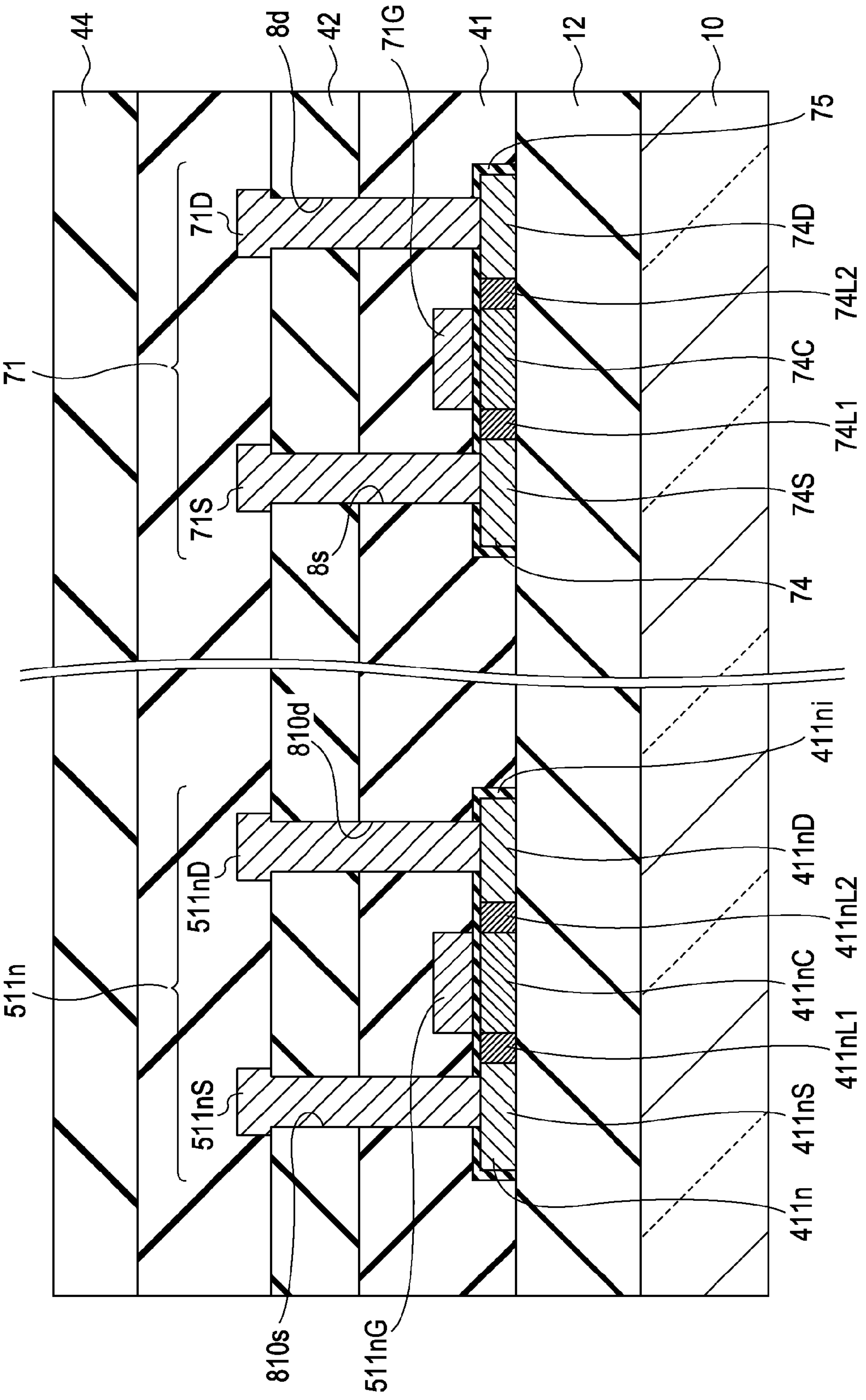
FIG. 7 includes cross-sectional views showing the concrete structure of an n-channel TFT included in the shift register and that of a TFT functioning as a sampling switch.

The concrete structure of the TFT included in the data line driving circuit and that in the sampling circuit in the liquid crystal display device according to the embodiment will now be described with reference to FIG. 7. FIG. 7 includes a cross-sectional view of the n-channel TFT included in the shift register and that of the TFT functioning as the sampling switch.

Referring to FIG. 7, a TFT 511*n*, serving as the n-channel TFT included in the shift register 51, is arranged on an underlying insulating layer 12 on the TFT array substrate 10. The TFT 511*n* will be referred to as "shift register TFT" hereinafter. A TFT 71, serving as the n-channel TFT which functions as the sampling switch 7*a*, is also arranged on the underlying insulating layer 12. The TFT 71 will be referred to as "sampling switch TFT" hereinafter.

In FIG. 7, the shift register TFT 511*n* includes a semiconductor layer 411*n*, a gate electrode 511*n*G, a gate insulating layer 411*ni*, a source line 511*n*S, and a drain line 511*n*D.

The semiconductor layer 411*n* has a channel region 411*n*C, LDD regions 411*n*L1 and 411*n*L2, a source region 411*n*S, and a drain region 411*n*D.

The source region 411*n*S and the drain region 411*n*D are arranged on opposite sides of the channel region 411*n*C. The LDD region 411*n*L1 is disposed between the source region 411*n*S and the channel region 411*n*C. The LDD region 411*n*L2 is disposed between the drain region 411*n*D and the channel region 411*n*C. Each of the source region 411*n*S, the drain region 411*n*D, and the LDD regions 411*n*L1 and 411*n*L2 is a doped region made by impurity implantation, e.g., ion implantation, i.e., implanting (doping) impurity ions into the semiconductor layer 411*n*. The LDD regions 411*n*L1 and 411*n*L2 are formed such that the concentration of the impurity in the regions is lower than that in the source region 411*n*S and the drain region 411*n*D.

In the embodiment, the source region 411*n*S, the drain region 411*n*D, and the LDD regions 411*n*L1 and 411*n*L2 in the shift register TFT 511*n*, serving as the n-channel TFT, are doped with n-type impurity ions, such as phosphorus (P) ions More specifically, the source region 411*n*S and the drain region 411*n*D are doped with the n-type impurity ions, such as phosphorus (P) ions, at a high concentration (e.g., approximately 1.3×1015 [/$cm^2$]) and the LDD regions 411*n*L1 and 411*n*L2 are doped with the n-type impurity ions, such as phosphorus (P) ions, at a low concentration (e.g., approximately 2.5×1013 [/$cm^2$]).

Each p-channel TFT included in the shift register 51 is constructed as a self-aligned TFT. The source region and the drain region of a semiconductor layer included in the p-channel TFT in the shift register 51 are doped with p-type impurity ions, such as boron fluoride ($BF_2$) ions or boron (B) ions, at a predetermined concentration (e.g., approximately 1.3×1014 [/cm$^2$]).

The source line 511*n*S is arranged over the semiconductor layer 411*n* with insulating interlayers 41 and 42 therebetween such that the source line 511*n*S is electrically connected to the source region 411*n*S via a contact hole 810*s* which extends through the insulating interlayers 41 and 42 and the gate insulating layer 411*ni*. The drain line 511*n*D, composed of the same layer as that of the source line 511*n*S, is electrically connected to the drain region 411*n*D via a contact hole 810*d* which extends through the insulating interlayers 41 and 42 and the gate insulating layer 411*ni*. An insulating interlayer 44 is arranged over the source line 511*n*S and the drain line 511*n*D.

Referring to FIG. 7, the sampling switch TFT 71, serving as the n-channel TFT functioning as the sampling switch 7*a* (refer to FIG. 3), includes a semiconductor layer 74, a gate electrode 71G, a gate insulating layer 75, a source line 71S, and a drain line 71D.

The semiconductor layer 74 has a channel region 74C, LDD regions 74L1 and 74L2, a source region 74S, and a drain region 74D.

The source region 74S and the drain region 74D are arranged on opposite sides of the channel region 74C. The LDD region 74L1 is disposed between the source region 74S and the channel region 74C. The LDD region 74L2 is arranged between the drain region 74D and the channel region 74C. Each of the source region 74S, the drain region 74D, and the LDD regions 74L1 and 74L2 is a doped region made by ion implantation, i.e., implanting impurity ions into the semiconductor layer 74. The LDD regions 74L1 and 74L2 are formed such that the concentration of the impurity in the regions is lower than that in the source region 74S and the drain region 74D.

In particular, in the embodiment, the source region 74S and the drain region 74D in the sampling switch TFT 71, serving as the n-channel TFT, contain the same kind of impurity (for example, n-type impurity, such as phosphorus (P) ion) as that contained in the source region 411*n*S and the drain region 411*n*D in the shift register TFT 511*n*, serving as the n-channel TFT. In addition, the concentration of the impurity in the source region 74S and the drain region 74D is higher than that in the source region 411*n*S and the drain region 411*n*D. More specifically, the source region 411*n*S and the drain region 411*n*D are doped with the n-type impurity ions, such as phosphorus (P) ions, at a concentration of, for example, approximately 1.3×1015 [/cm$^2$], as described above. On the other hand, the source region 74S and the drain region 74D are doped with the same kind of impurity as that contained in the source region 411*n*S and the drain region 411*n*D at a concentration of, for example, approximately 2.3×1015 [/cm$^2$].

The LDD regions 74L1 and 74L2 are doped with the same kind of impurity as that contained in the source region 74S and the drain region 74D (i.e., the same kind of impurity as that contained in the LDD regions 411*n*L1 and 411*n*L2) at a concentration of, for example, approximately 2.5×1013 [/cm$^2$]. In other words, the concentration of the n-type impurity in the LDD regions 74L1 and 74L2 is substantially equal to that in the LDD regions 411*n*L1 and 411*n*L2.

Accordingly, the on-state current of the shift register TFT 511*n* can be lowered and that of the sampling switch TFT 71 can be increased. Therefore, the current consumption in the shift register TFT 511*n* can be reduced and the capability of the sampling switch TFT 71 can be increased. Consequently, the life of the shift register 51 can be extended and the driving capability of the sampling circuit 7 can be increased. Thus, the liquid crystal display device according to the embodiment can display high-quality images while extending the life of the device.

The source line 71S is arranged over the semiconductor layer 74 with the insulating interlayers 41 and 42 therebetween and is electrically connected to the source region 74S via a contact hole 8*s* which extends through the insulating interlayers 41 and 42 and the gate insulating layer 75. The drain line 71D, composed of the same layer as that of the source line 71S, is electrically connected to the drain region 74D via a contact hole 8*d* which extends through the insulating interlayers 41 and 42 and the gate insulating layer 75. The insulating interlayer 44 is arranged over the source line 71S and the drain line 71D.

In particular, in the embodiment, the above-described logic circuit 52 includes the n-channel TFTs. The n-channel TFTs have substantially the same structure as that of the sampling switch TFT 71. In other words, the source region and the drain region in each n-channel TFT included in the logic circuit 52 contain the same kind of impurity as that contained in the source region 411*n*S and the drain region 411*n*D in the shift register TFT 511*n*. In addition, the concentration of the impurity contained in the source region and the drain region of the n-channel TFT in the logic circuit 52 is higher than that in the source region 411*n*S and the drain region 411*n*D of the shift register TFT 511*n*. More specifically, the source region and the drain region in the logic circuit 52 are doped with the same kind of impurity as that contained in the source region 411*n*S and the drain region 411*n*D at a concentration of, for example, 2.3×1015 [/cm$^2$] in a manner similar to the source region 74S and the drain region 74D.

In the embodiment, the p-channel TFTs included in the above-described logic circuit 52 are of the self-aligned type. The source region and the drain region of the semiconductor layer included in each p-channel TFT are doped with the p-type impurity ions, such as boron fluoride ($BF_2$) ions, at a predetermined concentration (e.g., approximately 1.3×1014 [/cm$^2$]).

Accordingly, the on-state current of the shift register TFT 511*n* can be lowered and the on-state current of the n-channel TFT in the logic circuit 52 can be increased. Therefore, the current consumption in the shift register TFT 511*n* can be reduced and the capability of the n-channel TFT in the logic circuit 52 can be increased.

As described above, in the liquid crystal display device according to the embodiment, the current consumption in each n-channel TFT included in the shift register 51 can be reduced and the capability of each n-channel TFT included in the sampling circuit 7 and the logic circuit 52 can be increased. Consequently, the liquid crystal display device can display high-quality images while extending the life of the device.

According to the embodiment, the concentration of the impurity in the source region 74S and the drain region 74D of the sampling switch TFT 71 (and that in the source region and the drain region in each n-channel TFT included in the logic circuit 52) is higher than that in the source region 411*n*S and the drain region 411*n*D in the shift register TFT 511*n*. Alternatively, or in addition, according to a modification of the embodiment, the concentration of the n-type impurity in the LDD regions 74L1 and 74L2 in the sampling switch TFT 71 (and that in the LDD regions in each n-channel TFT included in the logic circuit 52) may be higher than that in the LDD regions 411*n*L1 and 411*n*L2 in the shift register TFT 511*n*. In this case, the on-state current of the shift register TFT 511*n* can be lowered and the on-state current of the sampling switch TFT 71 (and that of each n-channel TFT included in the logic circuit 52) can be increased. Therefore, the current consumption in the shift register TFT 511*n* can be reduced and the capability of the sampling switch TFT 71 (and that of each n-channel TFT included in the logic circuit 52) can be increased.

Electronic Apparatus

Figure 8:
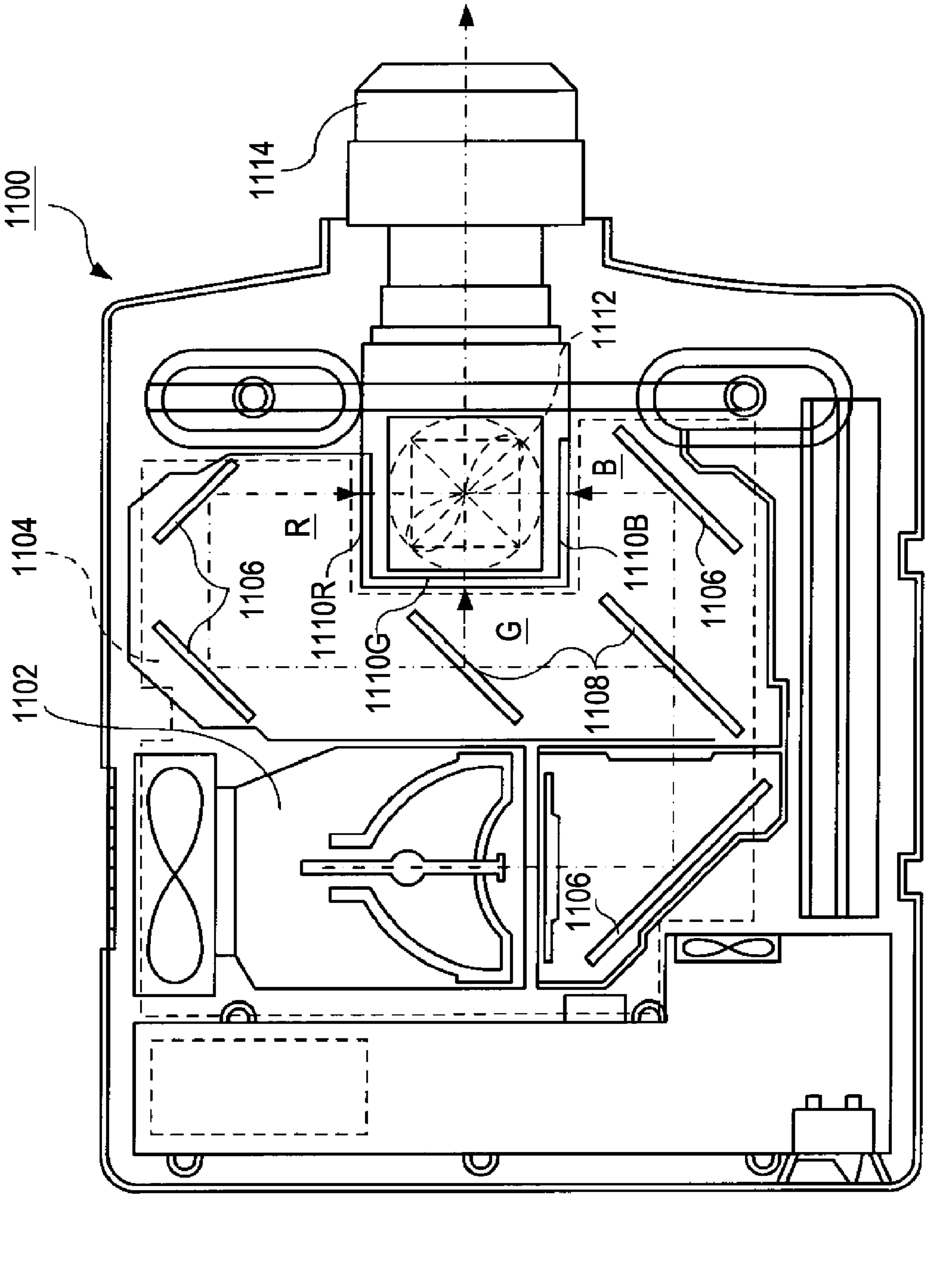
FIG. 8 is a plan view of the structure of a projector, serving as an electronic apparatus including an electro-optic device.

Various applications of the above-described liquid crystal display device, serving as an electro-optic device, will be described with reference to FIG. 8. A projector including the liquid crystal display device as a light valve will now be described below. FIG. 8 is a plan view of the structure of the projector.

Referring to FIG. 8, the projector, indicated at 1100, includes a lamp unit 1102, which includes a white light source, such as a halogen lamp. Light emitted from the lamp unit 1102 is split into light beams of three primary colors, R, G, and B by four mirrors 1106 and two dichroic mirrors 1108 arranged in a light guide 1104. The three light beams enter liquid crystal display panels 1110R, 1110B, and 1110G, respectively. Each liquid crystal panel serves as a light valve for the corresponding primary color light beam.

The liquid crystal display panels 1110R, 1110B, and 1110G have the same structure as that of the above-described liquid crystal display device. Those liquid crystal display panels are driven in accordance with R, G, and B primary color signals supplied from respective image signal processing circuits. The light beams, modulated by those liquid crystal display panels, traveling in three different directions enter a dichroic prism 1112. In the dichroic prism 1112, the R and B light beams are refracted at 90 degrees and the G light beam travels straight Accordingly, images of the respective color light beams are combined into one image, so that the resultant color image is projected onto a screen through a projection lens 1114.

Regarding images displayed by the respective liquid crystal display panels 1110R, 1110B, and 1110G, it is necessary that the image displayed by the liquid crystal display panel 1110G be reversed left to right relative to the images displayed by the liquid crystal display panels 1110R and 1110B.

Since the dichroic mirrors 1108 allow the light beams corresponding to the three primary colors, R, G, and B to enter the respective liquid crystal display panels 1110R, 1110B, and 1110G, a color filter are not needed.

In addition to the electronic apparatus explained with reference to FIG. 8, various electronic apparatuses include a mobile personal computer, a mobile phone, a liquid crystal display television, view-finder type and monitor-direct-view type video tape recorders, a car navigation system, a pager, an electronic organizer, an electronic calculator, a word processor, a workstation, a video phone, a POS terminal, and an apparatus including a touch panel. As a matter of course, the present invention is applicable to those various electronic apparatuses.

The present invention can be applied not only to the liquid crystal display device described in the foregoing embodiment but also to a reflective liquid crystal display device (LCOS) in which elements are arranged on a silicon substrate, a plasma display panel (PDP), field emission type displays (FED and SED), an organic EL display, a digital micro-mirror device (DMD), and an electrophoretic device.

The invention is not limited to the above-described embodiment and many modification and variations are possible without departing from the spirit and scope of the invention as defined in the appended claims and in the specification. The technical scope of the invention also includes such a modified electro-optic device and an electronic apparatus including the modified electro-optic device.

The entire disclosure of Japanese Patent Application No. 2007-216790, filed Aug. 23, 2007 is expressly incorporated by reference herein.

What is claimed is:

1. An electro-optic device comprising:

a substrate;

a plurality of data lines and a plurality of scanning lines arranged on the substrate such that the data lines intersect the scanning lines;

a plurality of pixel units arranged for pixels corresponding to intersections between the data lines and the scanning lines; and an image signal supply circuit including a shift register that sequentially outputs transferred signals and another circuit that supplies image signals to the pixel units via the data lines in response to the sequentially output transferred signals output from the shift register, the shift register including a plurality of first transistors each including a first semiconductor layer having a first source region and a first drain region, the other circuit including a plurality of second transistors each including a second semiconductor layer having a second source region and a second drain region, wherein the second source and drain regions contain the same kind of impurity as that contained in the first source and drain regions and contain a higher concentration of the impurity than a concentration of the impurity in the first source and drain regions, wherein the other circuit includes:

an enable circuit that shapes the waveforms of the sequentially output transferred signals using a plurality of enable signals to output the resultant signals as shaped signals; and a sampling circuit that samples the image signals in response to the shaped signals or signals based on the shaped signals to supply the sampled signals to the data lines.

2. An electronic apparatus comprising the electro-optic device according to claim 1.

3. An electro-optic device comprising:

a substrate;

a plurality of data lines and a plurality of scanning lines arranged on the substrate such that the data lines intersect the scanning lines;

a plurality of pixel units arranged for pixels corresponding to intersections between the data lines and the scanning lines; and an image signal supply circuit including a shift register that sequentially outputs transferred signals and another circuit that supplies image signals to the pixel units via the data lines in response to the sequentially output transferred signals, the shift register including a plurality of first transistors each including a first semiconductor layer having a first channel region, a first source region, a first drain region, and first LDD regions formed such that one of the first LDD regions is disposed between the first channel region and the first source region and the other is disposed between the first channel region and the first drain region, the other circuit including a plurality of second transistors each including a second semiconductor layer having a second channel region, a second source region, a second drain region, and second LDD regions formed such that one of the second LDD regions is disposed between the second channel region and the second source region and the other is disposed between the second channel region and the second drain region, wherein the second LDD regions contain the same kind of impurity as that contained in the first LDD regions and contain a higher concentration of the impurity than a concentration of the impurity in the first LDD regions, wherein the other circuit includes:

an enable circuit that shapes the waveforms of the sequentially output transferred signals using a plurality of enable signals to output the resultant signals as shaped signals; and a sampling circuit that samples the image signals in response to the shaped signals or signals based on the shaped signals to supply the sampled signals to the data lines.

* * * * *